United States Patent [19]

Brockelsby

[11] Patent Number: 4,566,872
[45] Date of Patent: Jan. 28, 1986

[54] VARIABLE SPEED TRANSMISSION FOR PORTABLE WINCH

[76] Inventor: Norman D. Brockelsby, 1127 N. Sherman, Grand Island, Nebr. 68801

[21] Appl. No.: 619,309

[22] Filed: Jun. 8, 1984

[51] Int. Cl.⁴ .............................................. F16H 7/08
[52] U.S. Cl. ..................................... 474/101; 474/109
[58] Field of Search .................... 474/101, 12, 109, 17

[56] References Cited

U.S. PATENT DOCUMENTS

| 2,726,364 | 12/1955 | Merritt | 474/109 X |
| 3,538,789 | 11/1970 | Quick et al. | 474/109 X |
| 3,741,026 | 6/1973 | Franzen | 474/109 |

FOREIGN PATENT DOCUMENTS 895706  2/1945  France ............................... 474/109

*Primary Examiner*—James A. Leppink
*Assistant Examiner*—Frank McKenzie

[57] ABSTRACT

The driving tension of a drive belt is maintained by axial force components applied to a pair of adjustable diameter pulleys about which the drive belt is entrained. A spring force is divided into such force components under control of relative torque loadings applied to the pulleys through drive shafts thereby also establishing a drive ratio that is automatically varied by relative adjustment of the pulley diameters.

12 Claims, 9 Drawing Figures

4,566,872

VARIABLE SPEED TRANSMISSION FOR PORTABLE WINCH

BACKGROUND OF THE INVENTION

This invention relates to a variable speed, belt drive transmission.

Belt drive transmissions having adjustable diameter pulleys are well known. Such transmissions are provided with belt tightening devices to maintain proper belt tension in the operative drive range of the transmission. Generally, an idler pulley is biased to an adjusted position to maintain such belt tension. Drive ratio control on the other hand, is effected by adjustment of the belt engaging diameter of a drive or driven pulley. Rather complex pulley mounting and control arrangements are associated with the foregoing type of transmission, especially where automatic drive ratio control is involved.

It is therefore an important object of the present invention to Provide a belt transmission of the variable drive ratio type that is less complex and therefore less costly, and yet effectively performs the same functions, including automatic torque controlled change in drive ratio.

SUMMARY OF THE INVENTION

In accordance with the present invention, a transmission formed by a pair of adjustable diameter pulleys are mounted on parallel spaced shafts between which torque is transmitted by a drive belt entrained about both pulleys. A single belt tightening device applies a spring tensioning force, through push rods slidably mounted in the shafts, to the pulleys for adjustment to establish belt driving tension. The spring force is, however, distributed between the pulleys by a force dividing lever engaging the push rods and fulcrummed on a movable pivot pin. The tensioning load on the transmission is sensed by a load sensing cell to exert a load force on the force dividing lever to automatically vary the drive ratio between the pulleys.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENT

Figure 1:
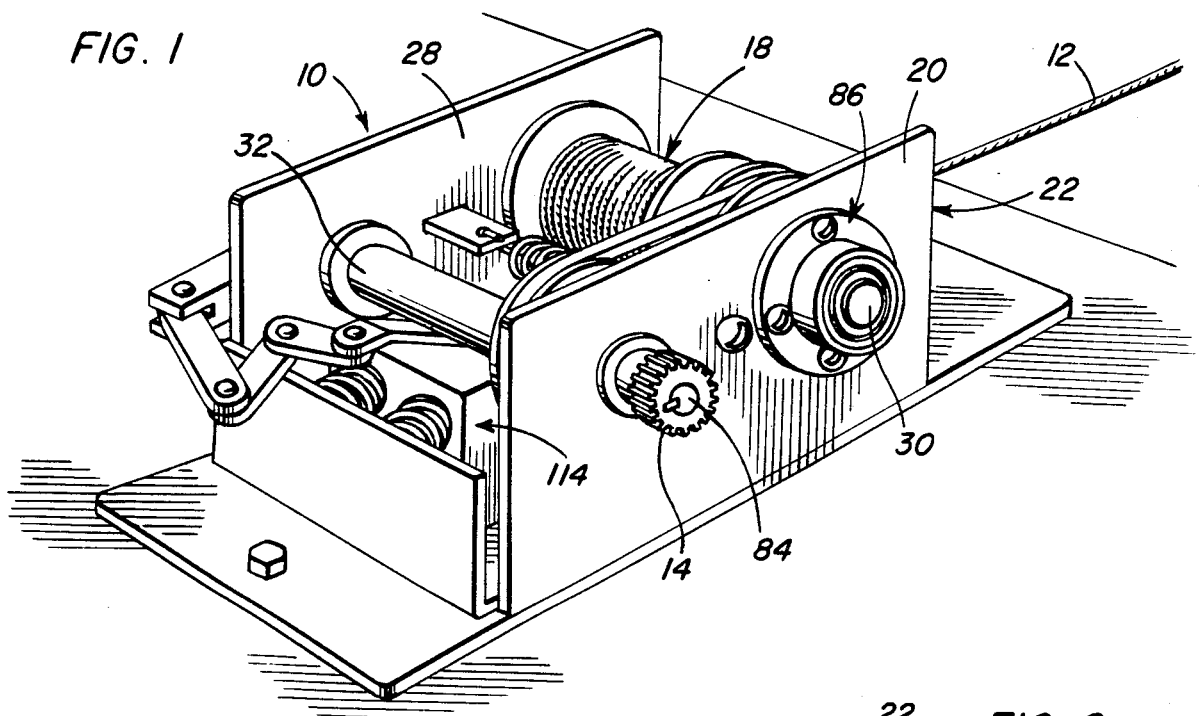
FIG. 1 is a perspective view of a transmission constructed in accordance with the present invention.
Figure 2:
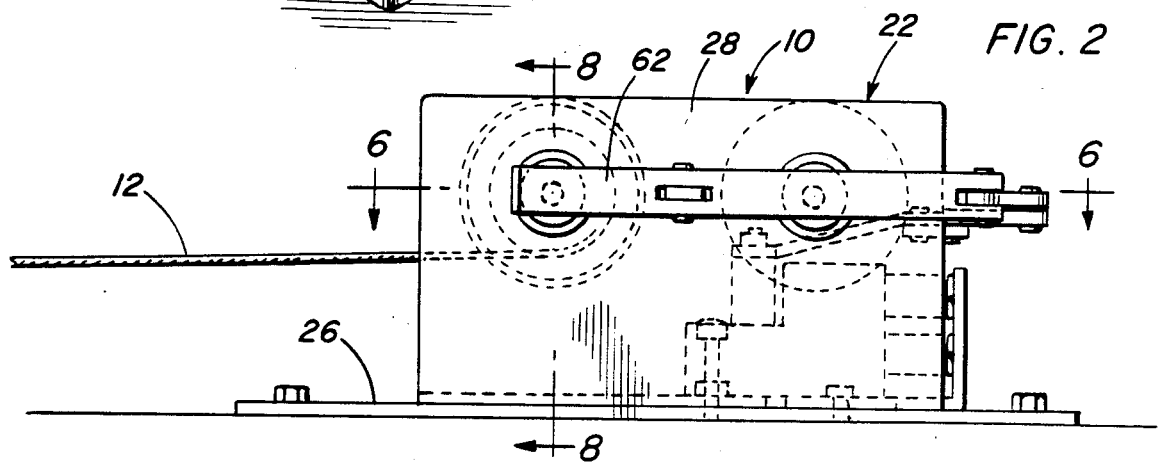
FIG. 2 is a side elevation view of the transmission shown in FIG. 1.
Figure 5:
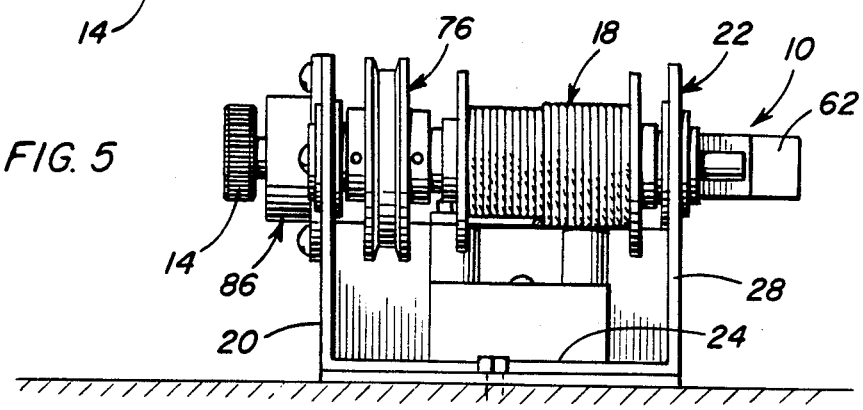
FIG. 5 is an end view of the transmission shown in FIGS. 1 and 2.

Referring now to the drawings in detail, a portable transmission unit 10 is shown in FIGS. 1, 2 and 5, adapted to be drivingly connected to a small gasoline engine (not shown) through gearing 14 to drive a load such as a winch formed by a drive reel 18 to which a load line 12 is anchored. The transmission unit has a housing 22 formed by side walls 20 and 28 interconnected by a bottom wall 24. The housing is slidably mounted on a fixed base plate 26. The reel 18 and gear 16 are connected to the axial end portions of a pair of drive shafts 30 and 32 rotatably mounted in parallel spaced relation to each other between the side walls 20 and 28 of the housing 22 as more clearly seen in FIG. 6.

Figure 8:
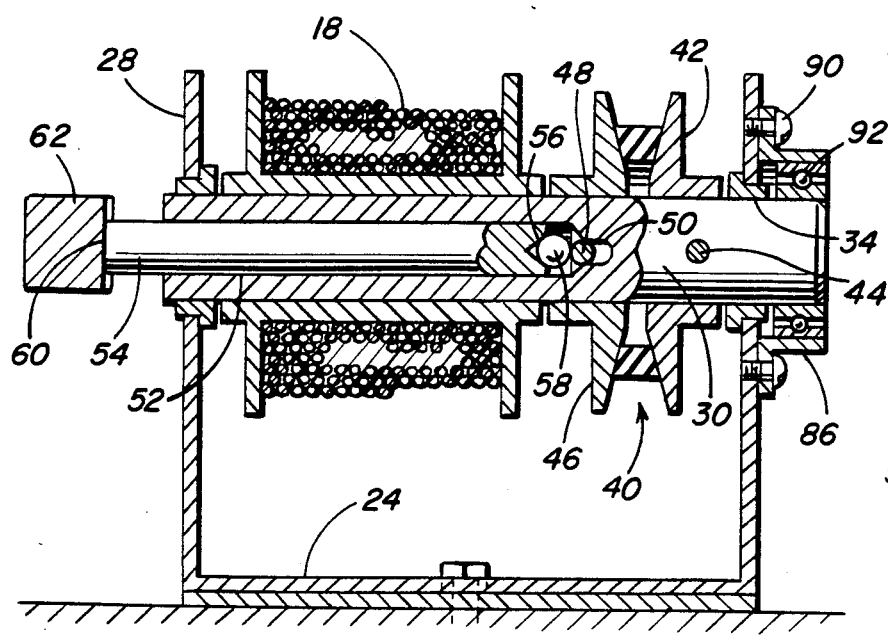
FIG. 8 is an enlarged section view taken substantially through a plane indicated by section line 8—8 in FIG. 2.
Figure 9:
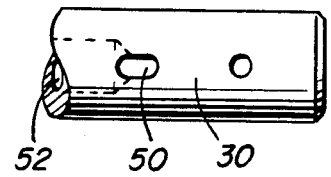
FIG. 9 is a partially side elevation view of one of the drive shafts associated with the transmission.
Figure 6:
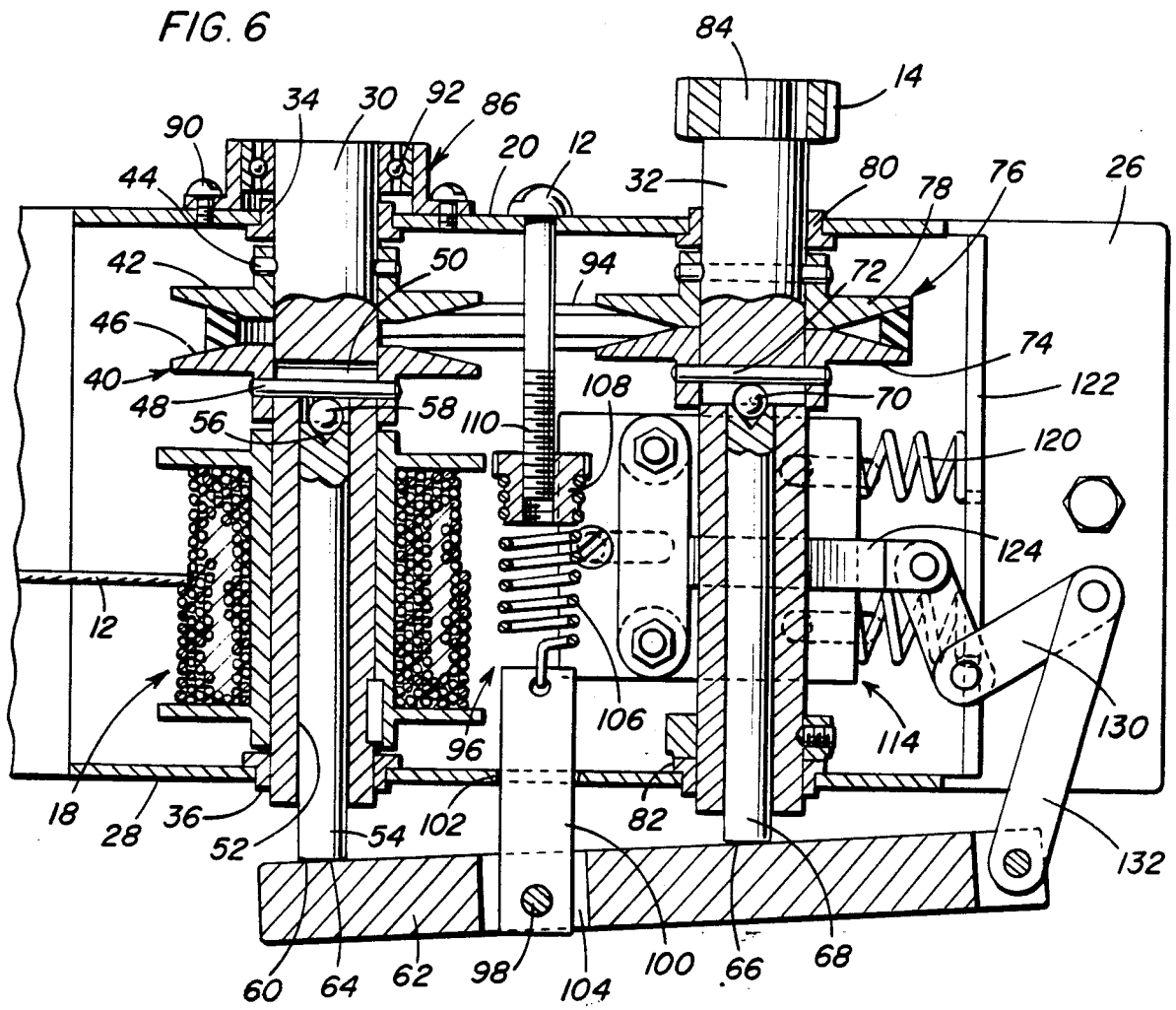
FIG. 6 is an enlarged section view taken substantially through a plane indicated by section line 4—4 in FIG. 2.

As more clearly seen in FIGS. 6 and 8, the drive shaft 30 is rotatably supported by sleeve bearings 34 and 36 fixed in openings in the housing side walls. The reel 18 is fixed to the shaft 30 between the side walls. Also, mounted on shaft 30 within the housing adjacent to the side wall 20 is an adjustable variable diameter pulley 40. The pulley 40 has a sheave 42 rotatably and axially fixed to the shaft 30 by a connecting pin 44. A confronting sheave 46 of the pulley is axially displaceable on the shaft 30 by a limited amount for adjustment purposes. The sheave 46 is rotationally fixed to the drive shaft 30 by a transverse connecting pin 48 extending through a slot 50 formed in the shaft intermediate its opposite ends. An axial bore 52 is also formed in shaft 30 and extends from the slot 50 to the end opposite the drive pulley 12. A force transfer push rod 54 is slidably mounted in the bore 52. One end of the push rod has a conical recess 56 seating a force locating ball 58 in engagement with the connecting pin 48. The other end 60 of the push rod 54 projects from the drive shaft 30 externally of the housing into engagement with a force distributing lever 62. The lever 62 is engaged by the end 60 of push rod 54 along one contact portion 64 while a contact portion 66 is engaged by the end of a second push rod 68 slidably mounted within and projecting from drive shaft 32.

The push rod 68, like push rod 54 transfers force through a ball element 70 and connecting pin 72 to an axially displaceable sheave 74 of a second adjustable pulley 76, also having a sheave 78 axially fixed to drive shaft 32. The drive shaft 32 is rotatably supported by sleeve bearings 80 and 82 in the housing side walls. The external end portion 84 of the shaft 32 has the gear 14 secured thereto. A one-way brake assembly 86 mounted on the side wall 20 limits rotation of drive shaft 30 to one direction. The brake assembly includes an annular flanged bearing sleeve 88 secured by fasteners 90 to the side wall 20. The bearing sleeve 88 supports the outer race for one-way braking elements 92 received on an inner race secured to the drive shaft 30 as shown in FIG. 6.

With continued reference to FIG. 6, an endless drive belt 94 of the cross-sectionally V-shaped type is entrained about the adjustable pulleys 40 and 76 in order to transmit torque between the drive shafts when operatively tensioned in frictional driving engagement between the sheaves of the pulleys. An adjusted axial bias is accordingly exerted on the displaceable sheaves 46 and 74 of the pulleys through the push rods 54 and 68. The axial bias is established by means of a belt tightening device generally referred to by reference numeral 96. The device 96 is mounted in the housing between the drive shafts to apply a predetermined force that serves both pulleys in common to perform the belt tightening function by tensioning the drive belt 94. The predetermined force is, however, divided into two separate force components through the lever 62 to which a load force is applied at one end by a spring load sensing device 114 in order to control the drive ratio between the pulleys. The drive ratio is determined by the effective drive engaging diameters of the pulleys which in turn depends on the axial force components exerted through the push rods 54 and 68 as a result of the force distribution through the lever 62.

The lever 62 is pivotally mounted between the contact portions 64 and 66 by a movable fulcrum pin 98 fixed to a support bar 100 slidably mounted in a slot 102 formed in the wall 28 of the housing between the shaft bearings 36 and 82. The end of the support bar carrying fulcrum pin 98 externally of the housing extends through a slot 104 formed in the lever. The end of the support bar internally of the housing is connected to one end of a preload tension spring 106 associated with the belt tightening device 96. The other axial end of spring 106 is anchored to an adjustment nut 108 threadedly receiving an adjustment screw element 110. The screw element 110 is rotatably mounted in the side wall 20 of the housing, with its slotted head 112 externally abutting the side wall between shaft bearings 34 and 80.

It will be apparent that by appropriate adjustment the device 96 will maintain axial biases on the pulley sheaves 46 and 74 necessary to establish sufficient frictional pressure and tension on the drive belt 94 to transmit the torque applied to shaft 32 from a power source under no load conditions at a relative high drive ratio between pulleys. As the load on shaft 30 increases the lever 62 is displaced to redistribute a load force applied by load sensing device 114 by pivoting clockwise from the position shown in FIG. 3 to the position shown in FIG. 4 in order to increase the torque transmitted to shaft 30 and lower the output speed to meet load demand. Such change in output speed is occasioned by the enlarging of the effective diameter of pulley 40 toward the maximum shown in FIG. 4 while a corresponding decrease in the diameter of pulley 76 occurs to achieve a relatively low drive ratio. If the output torque loading decreases, the lever 62 pivots in the opposite direction to redistribute the load force between pulleys causing a corresponding change in pulley diameters and change the low drive ratio toward the high drive ratio at the other extreme. It will also be apparent that by throttle control of the engine power source, the input torque applied to shaft 32 could be varied relative to the output loading torque on shaft 30 in order to effect a corresponding torque responsive change in drive ratio.

Figure 3:
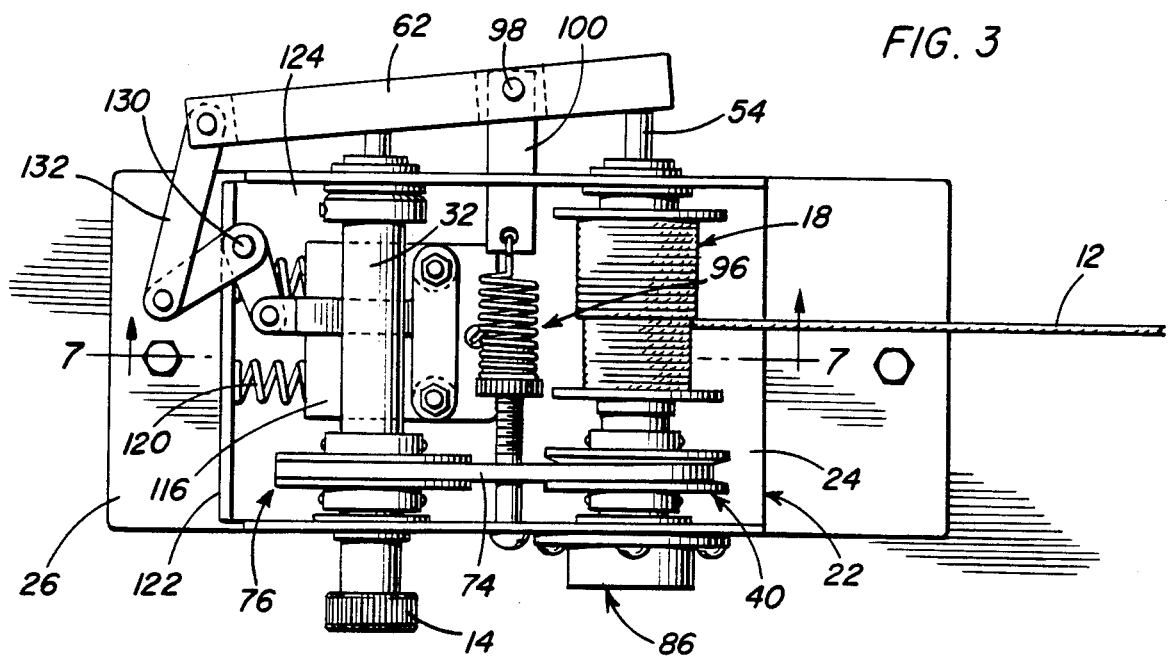
FIGS. 3 and 4 are top plan views of the transmission under high and low drive ratio conditions.
Figure 4:
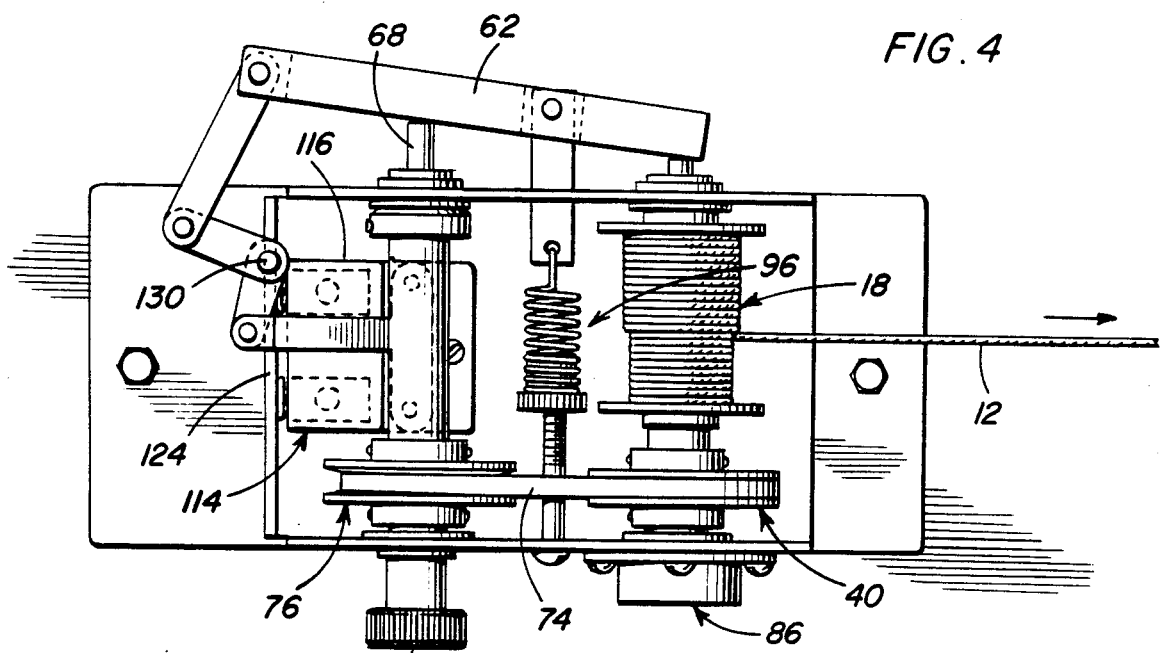
Figure 7:
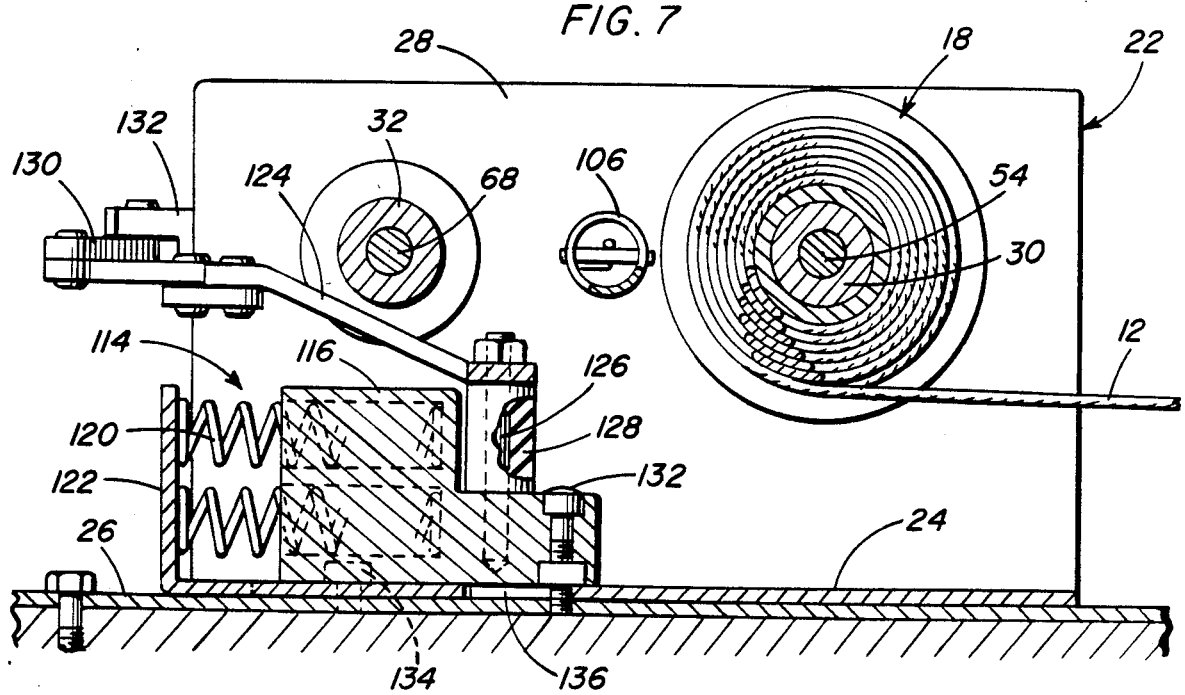
FIG. 7 is an enlarged section view taken substantially through a plane indicated by section line 5—5 in FIG. 3.

FIGS. 3, 4 and 7 illustrate in greater detail the load sensing device 114 which includes a block 116 fixed to base plate 26 by threaded fasteners 132 and 134 secured to the base plate and extending through slots 136 formed in the bottom wall 24 of the housing 22. Two pairs of compression springs 120 seated wthin bores formed in the block 116 abut a stop 122 secured to the housing so as to bias the housing in one direction to the limit position on the base plate as shown in FIG. 7. A control arm 124 is secured to the block by a pair of screw fasteners 126 extending through shock absorbing spacer sleeves 128. A bell crank 130 pivotally interconnects the control arm to a bar link 132, which is pivotally connected to the end of the lever 62. Thus, the springs 120 exert the load force on the end of lever 62 as aforementioned as a function of the tensioning load on the line 12. As the loading on shaft 30 increases, the push rod 54 is retracted and the push rod 68 extended until the slide block 116 is displaced to the low drive ratio position shown in FIG. 4 in which the maximum load force is exerted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a variable speed transmission having a housing, a pair of drive shafts rotatably mounted by the housing in spaced relation to each other, a pair of pulleys respectively connected to said drive shafts, an endless drive belt entrained about said pulleys and a belt tightening device operatively connected to said pulleys for maintaining the belt in operatively tensioned condition, the improvement residing in means for automatically varying the drive ratio between said drive shafts as functions of the torques applied thereto, comprising a belt tightening device for establishing a predetermined belt tensioning force, means for dividing said belt tensioning force into distributed force components, force transfer means for respectively transmitting the distributed force components to the pulleys to establish the tensioned condition of the drive belt and means for applying a load force to the force dividing means to establish said drive ratio.

2. The improvement as defined in claim 1 wherein said load force applying means comprises a load sensing device connected to the force dividing means for varying the drive ratio as a function of the loading on one of the drive shafts.

3. The improvement as defined in claim 2 wherein said force dividing means comprises a lever having spaced contact portions engaging the force transfer means, and movable fulcrum means connected to the belt tightening device for pivotally mounting the lever between said contact portions.

4. The improvement as defined in claim 3 wherein said belt tightening device comprises an adjustment element mounted on the housing, a preload spring anchored to the adjustment element between the drive shafts and a support element movably mounted by the housing interconnecting the preload spring and the fulcrum means of the force dividing means.

5. The improvement as defined in claim 4 wherein said force transfer means comprises a pair of push rods respectively mounted in the drive shafts, each of said push rods having opposite end portions, one of the end portions projecting into engagement with one of the contact portions of the lever and means engageable with the other of the end portions of the push rods for exerting the force components on the pulleys.

6. The improvement as defined in claim 1 wherein said belt tightening device comprises an adjustment element mounted on the housing, a preload spring anchored to the adjustment element between the drive shafts and a support element movably mounted by the housing interconnecting the preload spring and the force dividing means.

7. The improvement as defined in claim 3 wherein said force transfer means comprises a pair of push rods respectively mounted in the drive shafts, each of said push rods having opposite end portions, one of the end portions projecting into engagement with one of the contact portions of the lever and means engageable with the other of the end portions of the push rods for exerting the force components on the pulleys.

8. In a variable speed transmission having a housing, a pair of drive shafts rotatably mounted by the housing in spaced relation to each other and torque transmitting means for drivingly interconnecting the drive shafts, the improvement comprising tensioning means for applying a predetermined engagement force to maintain the torque transmitting means in a drive condition, loading means for establishing a load force, means for dividing said engagement and load forces into distributed force components, and force transfer means respectively transmitting the force components through the drive shafts to the torque transmitting means for both maintaining the drive condition thereof and varying the drive ratio between the drive shafts as functions of the torques applied thereto.

9. The improvement as defined in claim 8 wherein said force dividing means comprises a lever having spaced contact portions engaging the force transfer means and the spring loading means, and movable fulcrum means connected to the tensioning means for pivotally mounting the lever between two of said portions of the lever.

10. The improvement as defined in claim 9 wherein said force transfer means comprises a pair of push rods respectively mounted in the drive shafts, each of said push rods having opposite end portions, one of the end portions projecting into engagement with one of the portions of the lever and means engageable with the other of the end portions of the push rods for exerting the force components on the torque transmitting means.

11. In a variable speed transmission having a housing, a pair of drive shafts rotatably mounted by the housing in spaced relation to each other, a pair of pulleys respectively connected to said drive shafts, and an endless drive belt entrained about said pulleys, the improvement comprising force transfer means slidably mounted in each of the drive shafts for adjustment of the pulleys, load sensing means for establishing a loading force effecting said adjustment of the pulleys to maintain the drive belt under driving tension and means for distributing the loading force between said pulleys to control the drive ratio therebetween.

12. The combination of claim 11 wherein said load sensing means comprises a fixed base on which the housing is slidably mounted, spring means mounted on the base for biasing the housing to a limit position on the base, and linkage means operatively connecting the loading force distributing means to the base for varying the drive ratio in response to displacement of the housing under the bias of the spring means.

* * * * *